F. Z. MORIN.
FISHING SIGNAL.
APPLICATION FILED APR. 26, 1921.
1,391,002.
Patented Sept. 20, 1921.
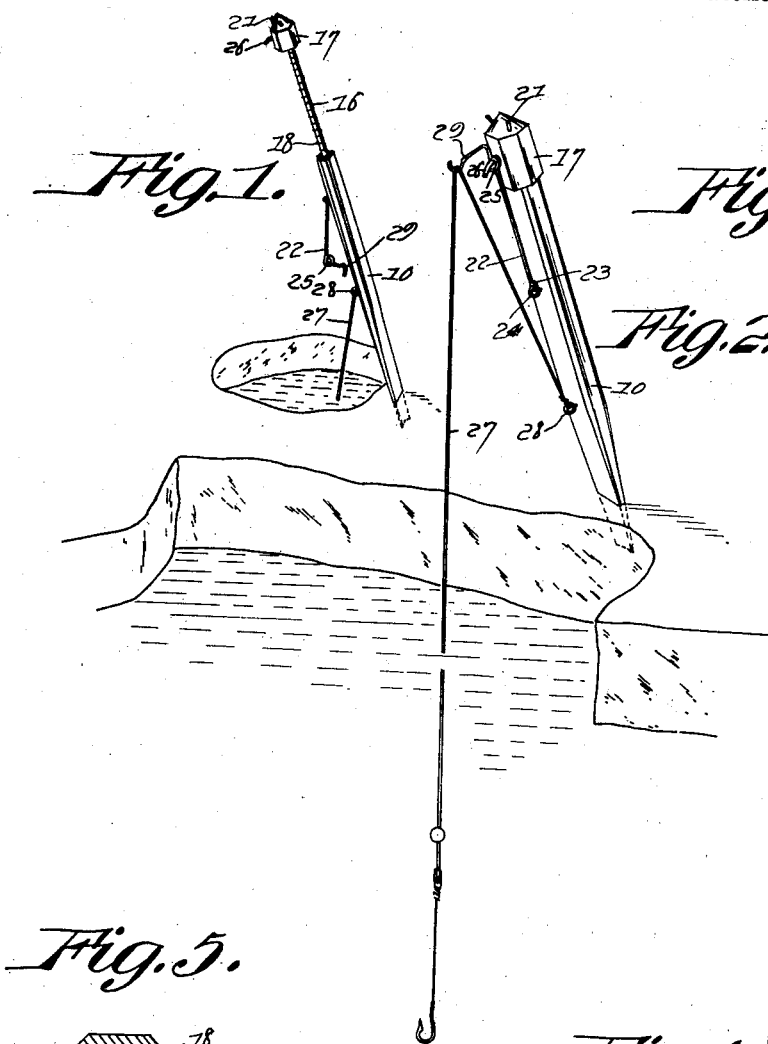
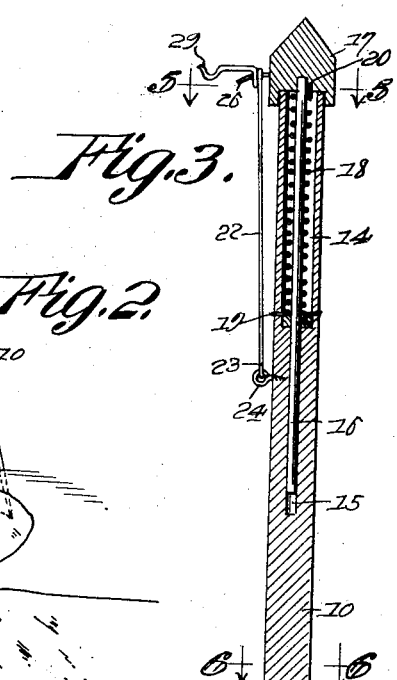
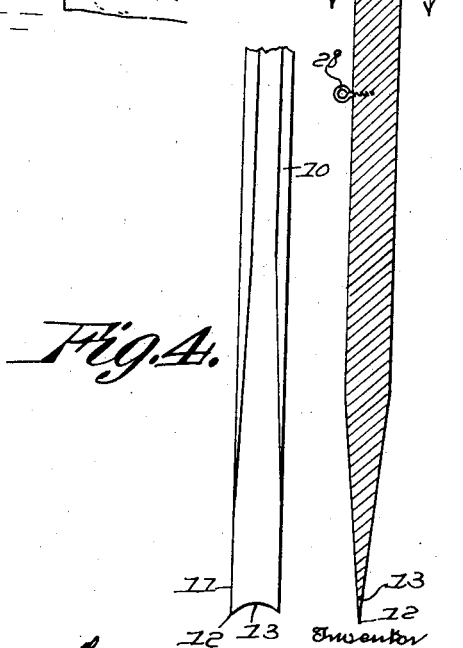
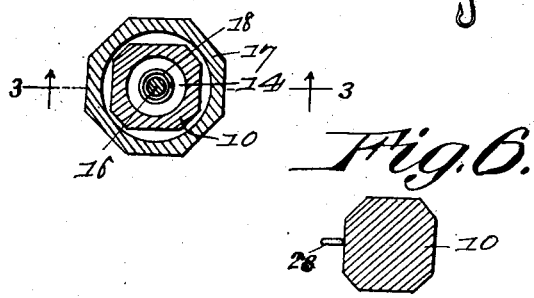
Inventor
Frank J. Morin.
By Thurls. Ankleman,
Attorney

UNITED STATES PATENT OFFICE.

FRANK Z. MORIN, OF SANFORD, MAINE.

FISHING-SIGNAL.

1,391,002.  Specification of Letters Patent.  Patented Sept. 20, 1921.

Application filed April 26, 1921. Serial No. 464,502.

*To all whom it may concern:*

Be it known that I, FRANK Z. MORIN, a citizen of the United States of America, and resident of Sanford, in the county of York and State of Maine, have invented certain new and useful Improvements in Fishing-Signals, of which the following is a specification.

This invention relates to fishing signals and particularly to a device employed for holding a fishing line while fishing through a hole in the ice, the said invention having for its object, the provision of novel means for holding a line in a manner that the line will trip the signaling device or flag and permit it to ascend, to indicate that the line has been pulled to such an extent as to trip the latch.

An object of this invention is to produce a device of this character having a body which may be anchored in the ice, associated with novel means whereby the signaling device or flag is held in its lowermost position, the said signaling device having means by which it is projected or elevated when released by the trigger or latch under the influence of a pull upon the fishing line.

A further object of this invention is to produce a signaling device of the character indicated having means for storing the line when not in use, the said line serving to hold the signal or flag in its lowermost position.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a perspective view showing the signaling device after it has been tripped;

Fig. 2 illustrates a similar view showing the signaling device and line in place prior to the tripping of the signal;

Fig. 3 illustrates a sectional view on the line 3—3 of Fig. 5;

Fig. 4 illustrates a view in elevation of a fragment of the lower end of the standard;

Fig. 5 illustrates a sectional view on the line 5—5 of Fig. 3; and

Fig. 6 illustrates a sectional view on the line 6—6 of Fig. 3.

In these drawings 10 denotes the body of the signaling device having a recessed end 11 forming spurs 12, which are adapted to penetrate the ice during the anchoring of the body, and the recessed portion 13 constitutes a seat for the line which is wrapped or looped around it when the device is to be taken down or stored. The body has a chamber 14 at its upper end and a reduced extension of the chamber 15, in which latter a guide rod 16 is slidable, the said guide rod projecting through the chamber 14 and being provided with a head 17. A spring 18 has one end anchored to the body, as at 19, and its opposite end anchored to the head, as at 20, and the said spring, when in the position shown in Fig. 6, is under compression and is extensible to force the rod 16 outwardly in order that it will carry the head to the position shown in Fig. 1, which will constitute a signal to inform a fisherman that the signal has been released, as will presently appear.

The head has studs 21 projecting from its upper side, and these studs are employed for engaging loops of a line which are wrapped around them after being extended around the lower end of the body in the seat 13, this affording a means by which the line may be stored, so that it cannot be readily dislodged until it is manually unwrapped.

A latch or trigger 22 has its lower end terminating in an eye 23 loosely connected to a screw eye 24 anchored in the body, and the trigger near its upper end has a looper portion forming an eye 25 which is placed over a pin or stud 26 projecting from the side of the head, and preferably this stud 26 is slightly downwardly curved to facilitate the disengagement of the loped portion therefrom under the pull of a fish on a line 27. The line is shown as being anchored to a screw eye 28 carried by the body, and when the signal is set during the fishing operation, the line extends over a hook 29 forming an extension of the looped portion of the latch, and therefore, when a pull is exerted on the line, it will serve to dislodge the latch from the pin to release the signal head and it will therefore ascend, as stated, to the position shown in Fig. 1, whereas when the device is set for the fishing operation, it will appear as shown in Fig. 2 with its end anchored in the ice and preferably in a slightly inclined position to permit the line to hang vertically through a hole in the ice.

By means of these devices, a fisherman may set a plurality of them and observe when any of them have been disturbed by the pull of a fish and he can then attend his line and re-set it.

I claim:

1. In a fishing device and signal, a body having a recessed end forming spurs, the said body having a chamber at its upper end and a reduced extension, a rod slidable in the chamber and in the extension thereof, a signal head carried by the rod, a spring encircling the rod in the chamber and having one end anchored to the head and the other end anchored to the body, studs on the head adapted to coact with the recessed end of the body for holding a fishing line, a pin projecting from the side of the head, a latch pivotally connected to the body and having a looped portion applied to the pin and an extension forming a hook, a line having one end anchored to the body and extending over the hook of the latch, as and for the purpose described.

2. In a fishing device and signal, a body, the said body having a chamber in its upper end and a reduced extension thereof, a rod guided in the extension and projecting through the chamber, a head carried by the rod, a spring for projecting the head and rod outwardly, a curved pin on the head, a latch having a looped portion to receive the pin, the said latch having an extension terminating in a hook, a line anchored to the body and having a portion looped over the hook whereby pull on the hook disengages the latch from the pin and releases the signal.

FRANK Z. MORIN.